UNITED STATES PATENT OFFICE.

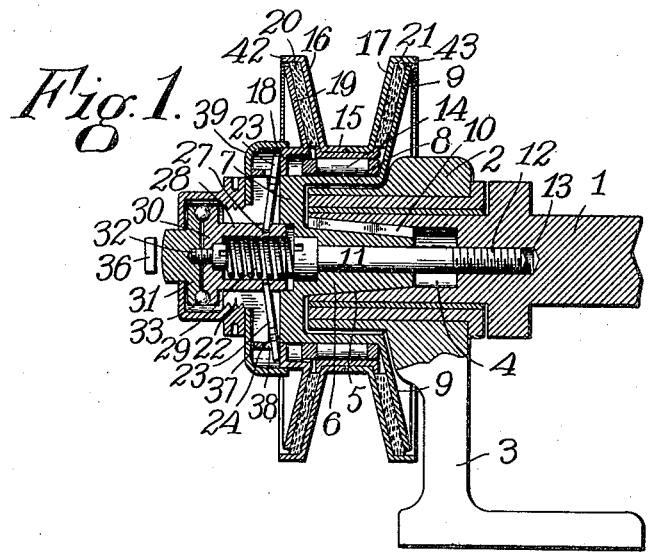
L. H. COBB.
FRICTION CLUTCH.
APPLICATION FILED DEC. 8, 1911.
1,146,403. Patented July 13, 1915.
Inventor
Lyman H. Cobb.
By Rufus B. Fowler
Attorney.
Witnesses
R. D. Tolman.
Penelope Cumberbach.

LYMAN H. COBB, OF FITCHBURG, MASSACHUSETTS, ASSIGNOR TO MARY ELIZABETH JOHNSON, TRUSTEE, OF FITCHBURG, MASSACHUSETTS.

FRICTION-CLUTCH.

1,146,403. Specification of Letters Patent. Patented July 13, 1915.

Application filed December 8, 1911. Serial No. 664,875.

*To all whom it may concern:*

Be it known that I, LYMAN H. COBB, a citizen of the United States, residing at Fitchburg, in the county of Worcester and Commonwealth of Massachusetts, have invented a new and useful Improvement in Friction-Clutches, of which the following is a specification.

The object of my present invention is to secure an efficient friction clutch of simple construction especially designed to be applied to the driving mechanism of a motor cycle, whereby the rotation of an engine shaft may be communicated at will to a belt pulley, sprocket wheel or the like.

My invention consists in certain novel features of construction and arrangement of parts as hereinafter described and pointed out in the annexed claims.

Referring to the accompanying drawings, Figure 1 represents a central sectional view of my improved clutch, with the operative parts in position to frictionally engage the driving and driven members of the clutch.
Fig. 2 is a side elevation shown partly in central sectional view, with the operative parts in position to release the driven member. Fig. 3 is an end view with the dust cap removed and also shown partly in section. Fig. 4 is a detached perspective view of the lever retaining ring 37.

Similar reference characters refer to similar parts in the different figures.

In the drawings 1 denotes a revoluble shaft journaled at one end in a journal bearing 2 in the framework 3 of the machine. The journaled end of the shaft 1 is provided with a concentric hole 4, a portion of which is tapered as shown at 5, Fig. 1, and adapted to receive the tapered hub 6 of a circular plate 7 having a peripheral flange 8 concentric with the axis of the hub 6 and overlapping the journal bearing 2. At the edge of the peripheral flange 8 opposite the plate 7 is an outwardly projecting flange 9 forming an obtuse angle with the peripheral flange 8. The hub 6 has a spline attachment with a shaft 1 by means of a key 10, and the hub is drawn snugly into the tapered interior of the shaft 1 by means of a bolt 11 having its screw threaded end 12 entering a concentric screw threaded hole 13 in the shaft 1.

Mounted upon the flange 8 is the driven member of the clutch consisting, in the present instance, of an annular belt pulley 15 capable of rotating freely upon rollers 14 interposed between the belt pulley and the flange 8. The belt pulley, as represented in the accompanying drawings, is adapted to receive an angular belt between the divergent sides 16 and 17. Outside the belt pulley 15 is a collar 18 having an upwardly extended flange 19 parallel to the divergent side 16 of the belt pulley.

Between the divergent sides 16 and 17 of the belt pulley and the flanges 9 and 19 respectively I preferably interpose annular sheets of leather, vulcanized fiber, or the like, 20, 21, attached to the sides 16 and 17 of the belt pulley. The plate 7 is provided with radial slots 22, in the present instance four in number, to receive the radial levers 23 pivotally connected to the plate 7 by means of lugs 24 resting in notches 25 formed in the edges of the plate 7. The outer ends 26 of the levers bear against the collar 18 and the inner ends of the levers enter notches 27 in a sliding sleeve 28 held concentrically in the plate 7. The sleeve 28 is normally forced outward by the pressure of a spiral spring 29, having one end bearing against the plate 7 and the other end against the end wall of the recess in the sleeve 28. The outer end of the sleeve 28 is closed by a plate 30 with which a plate 31 is rotatably connected by means of a screw 32. Between the plates 30 and 31 are interposed a series of anti-friction balls 33.

Fig. 1 represents the operative parts of the clutch in their normal position, with the pressure of the spring 29 applied to force the sleeve 28 outward and thereby rock the levers 23 on their pivotal lugs 24 to carry their outer ends 26 against the collar 18. The pressure of the levers 23 against the collar 18 moves the latter with its oblique flange 19 toward the flange 9. The collar 18 is provided with lugs 34 which enter notches 35 in diametrically opposite sides of the plate 7, causing the collar 18 and its flange 19 to be rotated by the shaft 1. The flanges 9 and 19, therefore, form the driving members of the clutch and the divergent sides 16 and 17 of the belt pulley form the driven member of the clutch.

In the normal position of the parts as shown in Fig. 1, the driven member of the clutch is clamped between the flanges 9 and 19 by the pressure of the spring 29 acting upon the pivoted levers 23, thereby causing the belt pulley to be rotated by its frictional contact with the flanges 9 and 19 between which it is firmly clamped. In order to release the driven member from the driving member of the clutch, pressure is applied against the plate 31 to force the sleeve 28 inward against the tension of the spring 29. This movement of the sleeve 28 reverses the rocking motion of the levers 23, carrying their outer ends 26 away from the collar 18 and relieving the pressure upon the sides of the belt pulley. In practice the release of the driven member may be accomplished by any suitable mechanical means such, for example, as the pressure of a lever 36 suitably pivoted to the framework of the machine.

After the parts above described have been assembled, a retaining ring 37 is slipped over the plate 7, said ring having notches 38 to receive the ends 26 of the radial levers 23. An annular flanged plate 39 is then placed against the plate 7 with its peripheral flange overlapping the collar 18. The plate 39 rests upon screw threaded extensions 40 of the plate 7 and is held in place by a cap 41 engaging the screw threaded extensions 40, thereby protecting the operative mechanism from dust.

My improved form of clutch is extremely compact and powerful, owing to the clamping action of the driving and driven members and by inclosing the driven member between the two driving members. An immediate release of the driven member is effected by the instantaneous action of the spring 29, allowing the belt pulley 15 to rotate freely upon the roller bearings 14. All the operative parts of the clutch are entirely inclosed and the friction surfaces between the belt pulley and the driving members 9 and 19 are likewise protected by the overlapping flanges 42 and 43 formed on the outer edges of the sides 16 and 17 of the belt pulley.

I claim,

1. The combination of a shaft, a journal bearing for said shaft, a circular plate provided with a hub attached to said shaft, a peripheral flange projecting from said plate over said journal bearing, a flange projecting outwardly from said peripheral flange, a second outwardly projecting flange movable on said peripheral flange, a driven member between said outwardly projecting flanges, and means for compressing the driven member between said outwardly projecting flanges.

2. The combination with a hollow shaft and a journal bearing for the end of said shaft, of a drum inclosing said journal bearing and having a hub held in said hollow shaft, a flange projecting outwardly from said drum and integral therewith, a second flange movable on said drum parallel with its axis, means for imparting the rotary motion of said drum to said second flange, a driven member interposed between said flanges, and means for applying pressure between said flanges and said driven member.

3. The combination of a shaft, a journal bearing for said shaft, a frictional clutching member attached to said shaft and extending over said journal bearing, a friction flange forming a second clutching member movable on said first clutching member, a driven member between said movable flange and said frictional clutching member and revoluble in the plane of said journal bearing, and means for engaging said driven member by said clutching members.

4. The combination of a shaft having a hollow end, a bearing for the end of said shaft, a hub held in the hollow end of the shaft, a plate carried by said hub provided with a peripheral flange overlapping said bearing, a driving pulley rotatable on said peripheral flange, and a clutching mechanism for connecting said driving pulley with said peripheral flange.

5. The combination of a shaft provided with a tapered concentric hole in its end, a tapered hub fitting said hole, a concentric bolt for drawing said hub into said tapered hole, a bearing for the end of said shaft, a belt pulley journaled in the plane of and outside said bearing, and clutching members for connecting said belt pulley with said shaft.

6. In combination, a rotatable member, a shaft, a sleeve fixed to said shaft and loosely carrying said member, said sleeve and member having parts capable of frictional end-thrust engagement, a plunger longitudinally movable in a part of said sleeve, and lever members radially projecting from the plunger through the sleeve and movable by longitudinal movements of said plunger to cooperate with said sleeve in engaging or releasing the frictional contact parts of said sleeve and rotary member.

7. In combination, a rotatable member, a shaft, a sleeve loosely carrying said rotary member, said sleeve having thrust parts at opposite ends of the member, a plunger guided for longitudinal movements by said sleeve, and levers radially projecting from and movable by said plunger to act against one of the thrust parts of said sleeve to frictionally engage said member and the other of said sleeve parts or to release such engagement.

8. In combination, a rotatable member, a drive element loosely carrying said member and having thrust parts at opposite ends of the member, radially projecting levers having portions disposed intermediate one of said thrust parts and said member and operable to coöperate with said thrust parts to cause one of them to have clutch engagement with the member in opposition to the levers, and means for rocking said levers.

Dated this seventh day of December 1911.

LYMAN H. COBB.

Witnesses:
PENELOPE COMBERBACH,
NELLIE WHALEN.

Copies of this patent may be obtained for five cents each, by addressing the "Commissioner of Patents, Washington, D. C."